April 24, 1945.  A. F. KALMAR  2,374,210
PROCESS FOR TREATING FRUITS
Filed June 19, 1943
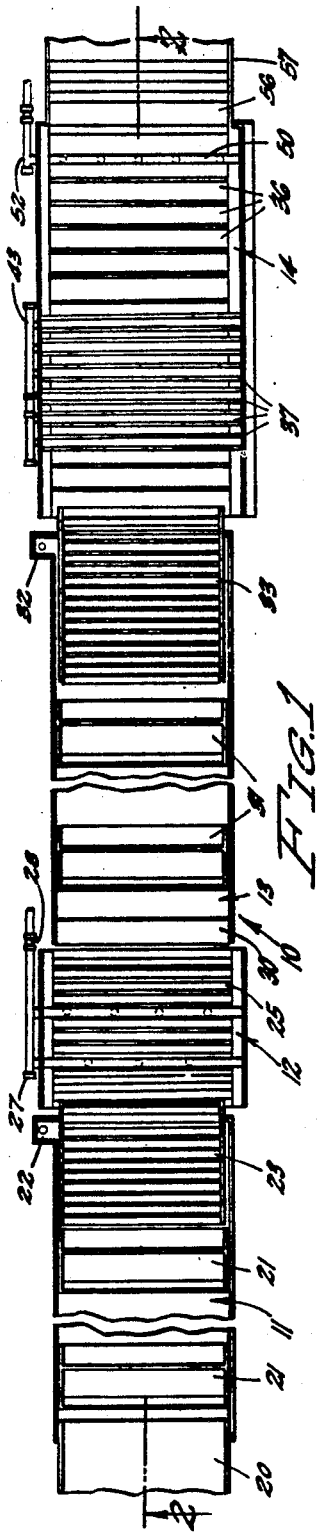
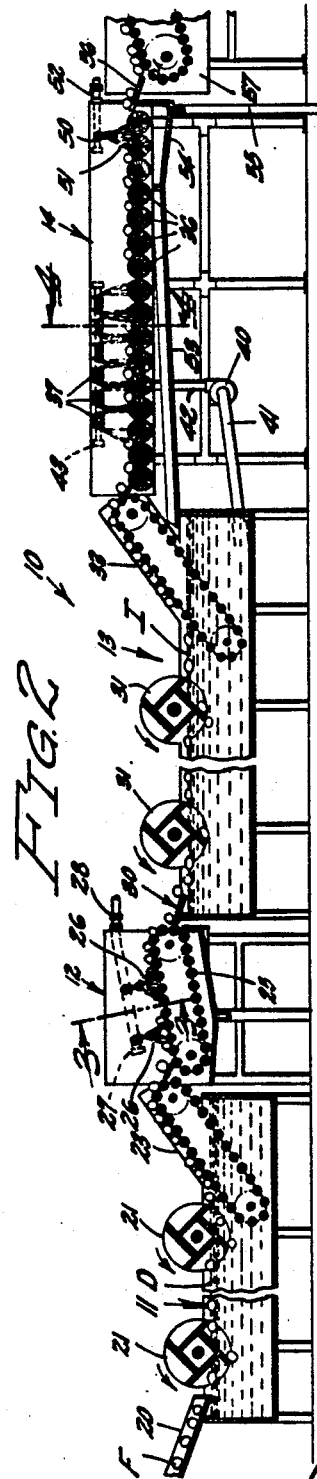
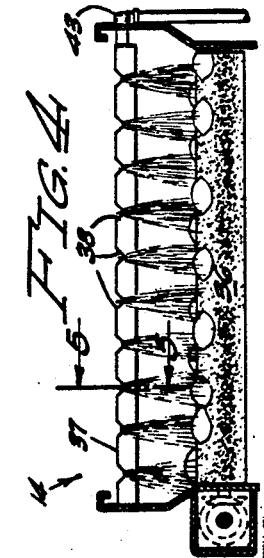
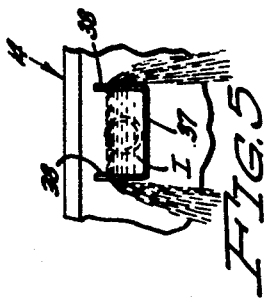
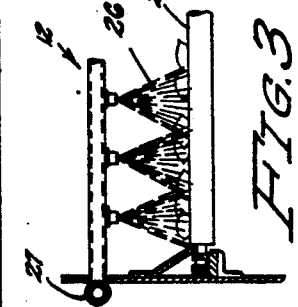
INVENTOR:
ARTHUR F. KALMAR
BY
ATTORNEY Patented Apr. 24, 1945

2,374,210

UNITED STATES PATENT OFFICE 2,374,210

PROCESS FOR TREATING FRUIT

Arthur F. Kalmar, Riverside, Calif., assignor to Food Machinery Corporation, San Jose, Calif., a corporation of Delaware Application June 19, 1943, Serial No. 491,520

4 Claims. (Cl. 99—156)

This invention has to do with the treatment of fruit and vegetables for the prevention of decay. Although especially useful in the treatment of citrus fruit, it is likewise adaptable for treating a wide variety of fruits and vegetables, including apples, tomatoes and cantaloupes.

It is a broad object of this invention to provide an improved process for treating fresh whole fruit when preparing this for market to prevent decay thereof caused by blue and green mold and other spoilage organisms during the considerable period of time which often elapses between the harvesting of the fruit and its ultimate consumption.

The decay of fresh fruit and vegetables, and particularly of citrus fruit, results mainly from infection taking place in injuries received in the picking and handling of the fruit incidental to its being harvested and prepared for marketing. To prevent this infection causing decay the fruit is generally disinfected shortly after it arrives at the packing house. To be suitable for this purpose, any disinfecting agent must be applied so that it extends into the cuts and punctures present in the rind of the fruit. This agent must also have no tendency to burn or injure the rind of the fruit.

Even though disinfected in this manner, the fruit is subject to re-infection by the introduction of mold spores present in the air into the rind injuries which did not heal as a result of said disinfection. Considerable decay being often caused by this re-infection, efforts have been made to find a suitable agent which, when applied to the fruit, will penetrate the injuries, remain active therein and kill any mold spores entering these injuries.

It is another object of my invention to provide a process of treating fruit in which the optimum agents and conditions are brought to bear upon the fruit for disinfecting the same, and the optimum agents and conditions are also brought to bear upon the fruit for immunizing the same against re-infection.

While applicable to other fruits and vegetables, the process of my invention is especially useful in the treatment of lemons, as it presents a solution to many problems met with in the preparation of lemons for market, and hitherto inadequately solved.

Lemons are picked according to size, and a large portion of these are green when picked and are stored for as much as several months to permit the fruit to ripen and acquire a natural lemon color before being packed for shipment. Some of the fruit when picked is, of course, already ripe and yellow in color, but the greater portion is as yet unripe and is sorted before being stored according to whether its surface may be classified as silver, light green, or dark green in hue. The darker the color of the fruit, of course, the longer it must remain in storage before it attains a lemon color and is ready for packing.

To prevent decay during storage, from the causes aforestated, the practice generally followed in harvesting lemons prior to my invention has been to treat the lemons at the time they are washed, before placing them in storage, with a hot solution of soda ash. To prevent reinoculation of the fruit during its long storage, the soda ash solution was not rinsed from the fruit, so that the surface of the fruit was covered with a thin film of soda ash when the solution dried. Sweating of the fruit in storage, which takes place not infrequently in California, produced a concentrated solution of soda ash on the rind of the fruit, which saponified the oils and waxes present on the rind. This was found to produce a substantial acceleration of the shrinkage rate of the fruit. Another difficulty with the soda ash treatment was the fact that it was an effective fungicide only when applied at a temperature of from 110 to 120 degrees Fahrenheit, and that to prevent oleocellosis or green spotting of the lemons by the releasing of lemon oil from the rinds by the heat, it was necessary for the lemons to be temporarily stored on the floor of the packing house from one to three days before treating the lemons and placing them in the ripening storage rooms. This extended delay between the picking and washing of the lemons caused a certain portion of the rind wounds in the fruit to heal over, thereby trapping mold fungus therein, so that these wounds would not be disinfected by the soda ash and would continue to infect and ultimately cause decay of the fruit.

It is an object of my invention to provide a process for treating lemons by which the lemons may be treated immediately upon their coming into the packing house from the field, which will disinfect all the injuries in the lemon rind before these have an opportunity of healing over, and which will immunize these injuries against re-infection during succeeding periods taken up by the storage and marketing of the fruit, and which will not increase the normal shrinkage rate of the lemons.

One class of agents suggested as suitable for both disinfecting citrus fruit and then immunizing it against subsequent reinfection are water soluble salts of hydroxy diphenyl, such as sodium or potassium orthophenylphenate. The salt of this class which is preferred for this purpose is sodium orthophenylphenate (see U. S. Letters Patent No. 2,054,392, to J. N. Sharma). In order for this agent to be used for this dual purpose, the fruit must be submerged in a solution of the agent, or the solution flooded over the fruit so that a considerable body of the solution must be prepared and used over and over again on the fruit. This agent has a tendency to hydrolyze when in a dilute solution, forming orthophenylphenol, a hydroxy diphenyl which is toxic to fruit and causes burning of the rind thereof. The suggestion is made in the Sharma patent (supra) that a certain amount of free alkali, such as sodium hydroxide, be added to the solution of sodium orthophenylphenate as a hydrolysis depressant to increase the pH and thereby prevent hydrolysis of this agent and the formation of orthophenylphenol. In attempting to use this agent for the initial disinfection of citrus fruit, which necessarily involves contacting the fruit over and over again with the same body of solution, I find that the free alkali in the solution reacts rapidly with $CO_2$ absorbed from the air, so that very close attention has to be paid to the solution to keep enough alkali therein to depress hydrolysis of the orthophenylphenate without getting so much alkali in the solution that the alkali itself will burn the fruit.

As will be pointed out hereinafter in describing my invention, I have discovered a way in which sodium orthophenylphenate may be practically applied in connection with the use of a hydrolysis depressant for the purpose of immunizing fruit from re-infection.

I have also discovered, and it is an object of my invention to provide, a mode of applying this agent in combination with other means for disinfecting the fruit initially so as to give a commercially practicable method which performs both functions of disinfecting the fruit and then immunizing it against re-infection. The process of my invention thus involves the use of a primary agent, the principal function and purpose of which is sterilization, and a secondary agent, the principal function and purpose of which is immunization.

Among the more powerful disinfectants which have had wide use in the disinfecting of citrus fruit, is sodium hypochlorite. (See Slater Patent No. 1,842,696.) This agent has enormous advantages derived from the fact that it operates at normal atmospheric temperatures, thus making it unnecessary to heat the bath in which it is applied or to heat the fruit in processing it.

Although a powerful fungicide and completely non-toxic to the fruit in customarily used concentrations, sodium hypochlorite cannot serve as an immunizer, as it breaks down within a relatively short time into products of reaction which are ineffective as fungicides. Moreover, sodium hypochlorite reacts with sodium orthophenylphenate, under the pH conditions normally existing in hypochlorite solutions applied to fruit, to form sodium chlororthophenylphenate, a compound which is much less potent against blue and green mold than either of the reactants. (See "Dipping Experiments With Oranges," by J. M. Rattray, pp. 170–176 Report of Low Temperature Research Laboratory, Department of Agriculture & Forestry, Division of Plant Industry, Union of South Africa, for the year June 1937 to June 1938, published 1939 by Government Printer, Pretoria.)

I have discovered that even though the hypochlorites be thoroughly rinsed from the fruit before applying sodium orthophenylphenate thereto, sufficient quantities of hypochlorite are retained in the cuts and punctures in the rind of the fruit, which it is particularly necessary to immunize, and that this hypochlorite has such a pH value, generally above 10, that any sodium orthophenylphenate which is thereafter applied without prohibitive delay will penetrate into the injuries and be converted into sodium chlororthophenylphenate.

It is another object of my invention, therefore, to overcome this nullification of the orthophenylphenate and to provide a dual process of sterilizing and immunizing fruit, in which the primary or sterilizing step is performed by a hypochlorite of an alkali forming metal, and the secondary or immunizing step is performed by a water soluble salt of hydroxy diphenyl. By alkali forming metal, I mean those metals (like sodium and calcium) the oxides and hydroxides of which are commonly referred to as "alkalies."

It is a further object of my invention to provide a process of treating fruit in which a water soluble salt of hydroxy diphenyl may be applied to the fruit without the necessity for constantly watching the alkalinity of the solution to maintain therein a suitable quantity of hydrolysis depressant.

The process of my invention is preferably performed in connection with the washing of the fruit, and this washing generally requires passing of the fruit through a solution of detergent and the subsequent scrubbing of the fruit with brushes in a washing machine while the detergent solution is flooded over the fruit. When the process of my invention is thus performed, the fruit is first treated with a bath of a solution of sodium hypochlorite preferably for a period of from four to five minutes, this solution being preferably at a temperature of about 70 degrees Fahrenheit.

Although in some instances a lower strength of hypochlorite solution is desirable, this solution when used on lemons and other citrus fruit, preferably contains .1% to 3% available chlorine by weight. As disclosed in my co-pending application for U. S. Letters Patent, Ser. No. 402,747, a synthetic wetting agent may also be, and preferably is, added to this solution, so as to assist in loosening the scale adhering to the fruit without the necessity of elevating the temperature of the latter, and to cause the hypochlorite to readily wet all surfaces contacted thereby, including the mold spores themselves. This wetting agent also promotes the penetration of the hypochlorite solution into all the cuts and punctures of the rind of the fruit, thereby resulting in a disinfection of all these injuries. A wetting agent found especially suitable for this purpose is sodium secondary tetradecyl sulfate which is commercially known as "Tergitol No. 4."

A buffer to maintain the pH between about 8.4 and 9.6 is also preferably added to the hypochlorite solution. This increases the fungicidal activity of the hypochlorite. Suitable buffers for this purpose are borax or a mixture of disodium phosphate and sodium carbonate.

Following treatment of the fruit by the primary agent employed in my method, I prefer to rinse the fruit to remove as much as possible of said agent as may be adhering thereto.

The fruit is next delivered into the detergent washing solution in which I place a reducing agent which operates rapidly on any hypochlorite present on the fruit, to reduce this to a relatively inert compound. An agent suitable for this purpose may be selected from a group as follows: phosphites, sulphites, bisulphites, metabisulphites, and thiosulphates of alkali forming metals. I have found sodium thiosulphate is especially suitable for use as a reducing agent in this solution, as it is non-toxic to fruit, so that there is no necessity for placing a limit on the strength with which it is used. The strength of this agent should be at least .05%, and for the performance of this function need not be more than 1.5% by weight.

In the present invention I apply the immunizing agent of the process to the fruit in the same solution which I apply the reducing agent thereto. The immunizing agent is a water soluble salt of hydroxy diphenyl which is preferably sodium orthophenylphenate, and the preferable quantity maintained in the solution is from about .02% to about 1.5% by weight.

In order to prevent hydrolysis of the immunizing agent which would form a water insoluble type which would have a toxic action on the fruit, it is necessary that the pH value of the detergent solution be maintained within a range of about 10.2 to 11.5. Very little hydrolysis takes place however before the pH falls below 10. The Sharma patent (supra) suggests the use of sodium hydroxide for this purpose, but I have found this unsuitable for use in the present invention.

I have discovered that the problem of controlling the pH value in the detergent solution in the present process may be solved by employing a buffer or regulator such as tetra sodium pyrophosphate. When .25% of this regulator is present in the solution, hydrolysis of the orthophenylphenate is prevented. I prefer to use an excess of this regulator, preferably about 1% by weight. Thus a reserve of regulator is provided which maintains the pH of the solution above 10.2 for a relatively long period of time without attention to the alkalinity of the solution being required.

Other buffers either of which is suitable to be used as the alkalinity regulator of my invention are .5% to 1% by weight of sodium carbonate or 1% to 1.25% by weight of tri-sodium phosphate.

After being submerged for a certain period in the detergent solution containing the reducing agent, the sodium orthophenylphenate and the buffer, the fruit is delivered to a washer where it is scrubbed by brushes while having said detergent solution flooded thereover. While it is sometimes desirable for portions of the detergent solution adhering to the fruit at the conclusion of the washing step to remain and dry onto the fruit, I prefer to rinse the fruit just before this passes out of the washer. This rinse should be a brief one just adequate to remove the detergent solution from the outer surfaces of the rind but insufficient to allow rinse water to penetrate into the punctures and other injuries in the rind. Thus the detergent solution already in these injuries remains there whereby the minute but adequate quantities of immunizing agent contained in this solution immunize the injuries against reinoculation.

Specific formulas for the two solutions of my process are as follows:

Disinfecting solution

| | Per cent by weight |
|---|---|
| Sodium hypochlorite (expressed as available chlorine) | .6 |
| Buffer, consisting of: | |
|     Disodium phosphate | 1.25 |
|     Sodium carbonate | 0.35 |
| Wetting agent, consisting of: Tergitol No. 4 | 0.15 |
| Water and inert salts | 97.65 |
| | 100.00 |

Detergent, reducing agent and immunizing solution

| | Per cent by weight |
|---|---|
| Detergent consisting of: | |
|     Soap | 0.20 |
|     Sodium carbonate | .50 |
| Reducing agent: sodium thiosulphate | 0.15 |
| Sodium orthophenylphenate | 0.15 |
| Buffer for depressing hydrolysis: tetra-sodium pyrophosphate | 1.00 |
| Water | 98.00 |
| | 100.00 |

The process of my invention when performed commercially requires the use of apparatus. In the accompanying drawing:

Fig. 1 is a plan view of an apparatus suitable for carrying out the process of my invention commercially.

Fig. 2 is a longitudinal sectional view taken on the line 2—2 of Fig. 1.

Fig. 3 is an enlarged fragmentary detail view taken on the line 3—3 of Fig. 2 and illustrating the rinsing of the fruit between the disinfecting and the immunizing steps of the method.

Fig. 4 is an enlarged transverse sectional view taken on the line 4—4 of Fig. 2, illustrating the flooding of the fruit with the washing and immunizing solution.

Fig. 5 is an enlarged detail sectional view taken on the line 5—5 of Fig. 4 and illustrating the operation of the detergent solution flooding the troughs of the apparatus.

Referring specifically to the drawing, this illustrates an apparatus 10 which includes a solution tank 11, a rinsing unit 12, a solution tank 13 and a washer 14.

The tank 11 has a delivery board 20 for delivering fruit thereto, continuously rotating submerging rotors 21, a drain 22 and an elevator 23 for lifting the fruit from the tank and delivering this to the unit 12.

The unit 12 includes an endless conveyor 25 which receives fruit from the elevator 23 conveys this beneath fresh water sprays 26 provided by a spray manifold 27 to which water is delivered from the domestic water system by a valve pipe 28.

The solution tank 13 has a delivery board 30 for receiving fruit delivered from the discharge end of the rinse unit 12. This tank also has submerging rotors 31, a drain 32 and an elevator 33 for removing fruit from the tank 13 and delivering this fruit to the washer 14.

The washer 14 has a plurality of transversely disposed continuously rotating brushes 36 over an initial group of which is disposed a series of flooding troughs 37 having notches 38. A power-operated pump 40 draws solution through a pipe 41 and discharges this through a pipe 42 and a manifold pipe 43 into the troughs 37 so that this solution floods continuously from the notches 38 and onto fruit carried on the brushes 36.

Adjacent the discharge end of the washer 14, there is provided a spray pipe 50 with suitable nozzles for discharging sprays 51 of rinse water onto the fruit travelling therebeneath. This pipe is connected to the domestic water system by a valved pipe 52.

When discharged from the washer 14, fruit travels over a delivery board 56 which conveys it to a sorting table 57 where it is sorted and boxed. Supported beneath that portion of the washer 14 over which the solution is flooded from the troughs 37, is a drain pan 53 which returns this solution to the tank 13. Disposed beneath the end rinse section of the washer 14 is a drain pan 54 which receives rinse water and delivers this to a pipe 55 leading to the sewer.

Operation

When the apparatus 10 is operated to perform the process of my invention, solutions D and I are supplied to the tanks 11 and 13 respectively to levels as indicated in Fig. 2. The solution D is the disinfecting solution of my process, and may have the specific composition suggested hereinabove as suitable for this. Solution I is the detergent, reducing agent and immunizing solution of my process, and may have the composition specifically suggested hereinabove as suitable for this.

Power is applied to the various moving elements of the apparatus to cause these to perform their functions as above indicated. Fruit F is now fed over the delivery board 20 in a continuous stream, this fruit passing entirely through the apparatus 10 and being discharged onto the sorting table 57 or any other piece of apparatus on which it is desired this be received. The tank 11 is preferably of such a length as to subject the fruit to at least a four-minute treatment in the solution D. During this period the hydrochlorite in this solution penetrates into all the cuts and other wounds in the surface of the fruit and thoroughly disinfects these.

The fruit is then removed by the elevator 23, rinsed in the unit 52 and discharged from the latter into the second treating tank 13. This tank is of such a length as to subject the fruit to immersion in solution I for a period which need not be more than about one minute. The treatment with solution I, of course, continues during the removal of the fruit on the elevator 33 from the tank 13 and the scrubbing of the fruit in the washer 14 while the solution I is being flooded thereover from the troughs 37.

The detergent in the solution I supplements the cleaning process begun in the solution D, and so softens up solid matter adhering to the surface of the fruit that this is readily removed by the action of the brushes 36 in the washer 14. The reducing agent in the solution I quickly neutralizes all of the hypochlorite remaining on the fruit after the latter is rinsed in the unit 12. The reducing agent reacts so quickly with the hypochlorite that traces of the latter in the injuries in the fruit rind are reduced to an inactive form before the hypochlorite has opportunity to react with the orthophenylphenate in solution I to convert this into chlororthophenylphenate. Therefore, during treatment of the fruit with the solution I, the hypochlorite in the fruit rind injuries is entirely neutralized and these injuries are impregnated with a quantity of immunizing agent, in this instance, sodium orthophenylphenate. The spray 51 to which the fruit is briefly subjected at the discharge end of the washer 14, merely rinses off that portion of the solution I which adheres to the outwardly exposed surfaces of the fruit and the rinse is purposely insufficient to wash the solution I out of the rind injuries.

As a result of treatment with the process of my invention the fruit is first thoroughly disinfected by the hypochlorite solution D, the latter killing practically all of the decay organisms present on the outer surface or in the surface interstices and rind injuries of the fruit.

As the solution I works into the rind injuries, the neutralizing of the traces of hypochlorite remaining in these injuries and the delivery of the immunizing agent thereinto are simultaneously performed. The pH value which is maintained in solution I by the buffer present therein is thus also maintained in the quantities of this solution delivered into the rind injuries so that no breakdown of the orthophenylphenate in these injuries to produce a toxic derivative thereof is possible after the fruit has been treated by my process.

It is thus clear that the immunizing agent remains active in its non-toxic form in the only places on the fruit subject to reinoculation. From this it is seen that the most complete job of disinfection on the one hand and immunization on the other is accomplished by the process of my invention.

Owing to the non-toxicity of excessive amounts of the buffer employed in solution I, an excess of this may be maintained in the solution thereby making close control of the composition of this solution unnecessary and eliminating the difficulty heretofore experienced in attempting to apply a solution of sodium orthophenylphenate to fruit.

What I claim is:

1. A method of protecting fresh whole fruit from decay which comprises: contacting the fruit with an aqueous solution of a hypochlorite of an alkali forming metal, and subsequently contacting said fruit with an aqueous solution containing a reducing agent selected from a group consisting of phosphites, sulphites, bisulphites, metabisulphites and thiosulphates of alkali forming metals and also containing a water soluble salt of hydroxy diphenyl and a buffer sufficient to maintain the pH above 10.

2. A method of protecting fresh whole fruit from decay which comprises: contacting the fruit with an aqueous solution of sodium hypochlorite, subsequently contacting said fruit with an aqueous solution containing a reducing agent selected from a group consisting of phosphites, sulphites, bisulphites, metabisulphites and thiosulphates of alkali forming metals, and also containing about .02% to about 1.5% by weight of sodium orthophenylphenate, and a buffer sufficient to maintain the pH above 10.

3. A method of washing fresh whole fruit and protecting the same from decay, which comprises: passing said fruit through an aqueous solution containing from .1% to 3% hypochlorite expressed as available chlorine; passing said fruit through an aqueous solution of a detergent also containing a reducing agent selected from a group consisting of phosphites, sulphites, metabisulphites and thiosulphates of alkali forming metals, and also containing a water soluble salt of hydroxy diphenyl and a buffer sufficient to maintain the pH above 10; and brushing said fruit while in contact with said solution last recited.

4. A method of washing fresh whole fruit and protecting the same from decay, which comprises: passing said fruit through an aqueous solution containing from .1% to 3% hypochlorite expressed as available chlorine; passing said fruit through an aqueous solution of a detergent also containing a reducing agent selected from a group consisting of phosphites, sulphites, metabisulphites and thiosulphates of alkali forming metals, and also containing a water soluble salt of hydroxy diphenyl and a buffer sufficient to maintain the pH above 10; brushing said fruit while in contact with said solution last recited; and rinsing said fruit after each of said treatments.

ARTHUR F. KALMAR.